Oct. 25, 1966  G. E. NICHOLS  3,280,492
DESK MOUNT FOR CALENDAR PADS, WRITING IMPLEMENTS AND MATERIALS
Filed Aug. 16, 1963
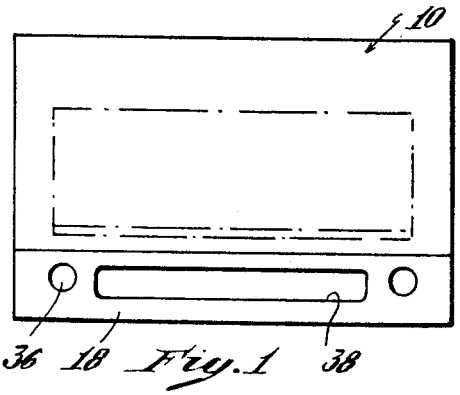
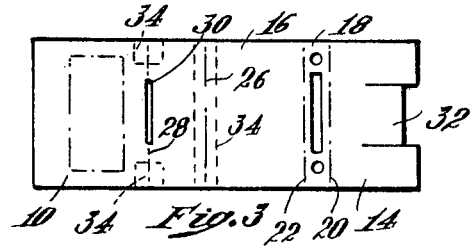
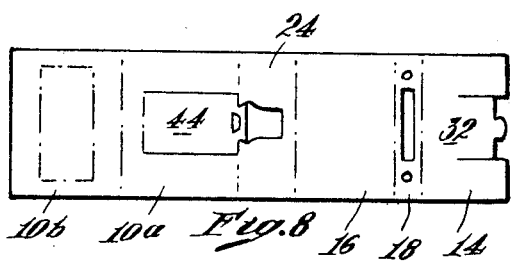
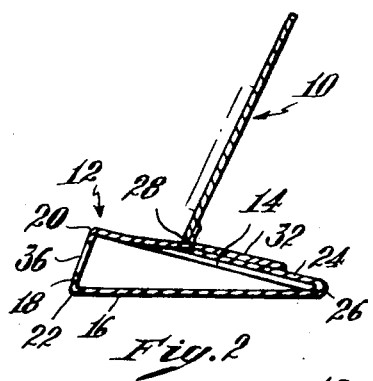
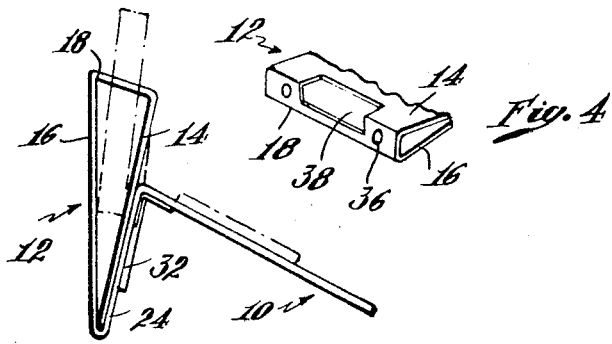
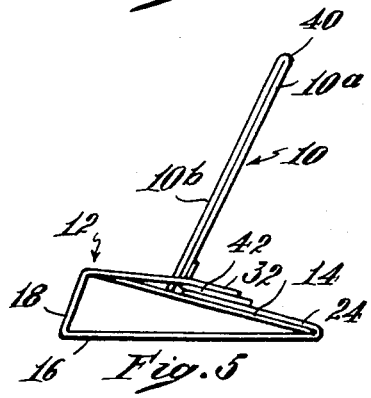
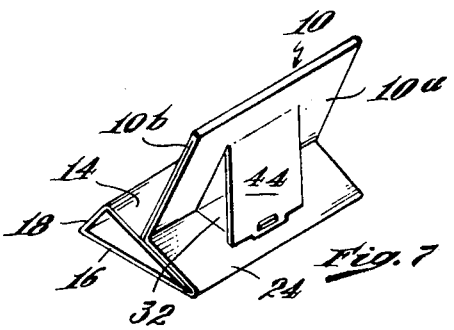
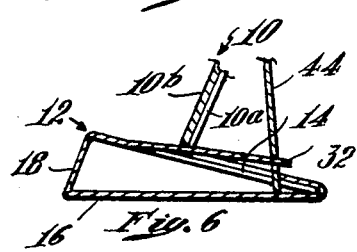
INVENTOR.
Gordon E. Nichols
BY
Roberts, Cushman & Grover
ATT'YS

United States Patent Office 3,280,492
Patented Oct. 25, 1966

3,280,492
DESK MOUNT FOR CALENDAR PADS, WRITING IMPLEMENTS AND MATERIALS
Gordon E. Nichols, Middleboro, Mass., assignor to Winthrop-Atkins Co., Inc., Middleboro, Mass., a corporation of Massachusetts
Filed Aug. 16, 1963, Ser. No. 302,524
6 Claims. (Cl. 40—120)

This application is a continuation-in-part of my pending application Serial No. 217,672, filed August 17, 1962, now Patent No. 3,207,320, for desk mount for Calendar Pads and the Like.

This invention relates to desk mounts for calendar pads and more especially to mounts provided with a support adapted to hold writing material, such as pens, pencils, memorandum pads, and the like.

The principal objects of the invention are to provide a mount which is sturdy, attractive, easy to manufacture by simple die-pressing operations, and which, by the simple expedient of changing its position in attaching the calendar pad to a different surface, provides mounts of different style.

As herein illustrated, the mount comprises connected angularly disposed parts, one part being of hollow triangular cross-section having sides situated at an acute angle and a side opposite the acute angle, and the other part being flat, one of the sides of the one part being connected at one edge to an edge of the other side, the other edge of the one side being connected to an edge of the other part, and the other edge of the one side being unconnected. The other part has frictional engagement with the other side and is operative, by such engagement, to hold the other side in triangular relation to the one side and the side opposite the acute angle, and a self-sustaining deformable hinge element situated at the connections between the parts is operative to hold the parts in angularly disposed positions relative to each other so that one part constitutes a support for the other. In the preferred position, the part of hollow triangular cross-section constitutes a base from the upper surface of which rises the other part which constitutes an upright panel to which a calendar pad may be attached. The side of the hollow part opposite the acute angle contains one or more openings and when the mount is disposed in this position pencils, pens, and the like, thrust through these openings into the base, will be supported in a nearly horizontal position. The structure may be disposed in an alternative position with the hollow part disposed in an upright position with its apex resting on a supporting surface, the side opposite the acute angle uppermost, and the flat part extending forwardly and downwardly from the hollow part and providing support for a calendar pad. In this alternative position, pencils or pens, thrust through the openings in the side opposite the acute angle of the hollow part, are supported in a substantially perpendicular position.

The invention will now be described in greater detail with reference to the accompanying drawings wherein:

FIG. 1 is a front elevation of the structure;
FIG. 2 is a vertical section of FIG. 1;
FIG. 3 is a plan view of the blank for making the mount shown in FIGS. 1 and 2;
FIG. 4 is a fragmentary perspective of the base of the mount shown in FIGS. 1 and 2, with an opening partly in the end and partly in the side wall;
FIG. 5 is an end elevation of a first modification;
FIG. 6 is a vertical section of a second modification in which a brace is employed for supporting the parts in angular relation to each other;
FIG. 7 is a perspective view of the structure shown in FIG. 6;
FIG. 8 is a plan view of the blank for making the mount shown in FIGS. 6 and 7; and
FIG. 9 is an elevation of the structure shown in FIGS. 1 and 2, repositioned to dispose the hollow part in an upright position and the flat part in a position extending forwardly and downwardly therefrom.

Referring to the drawings, the structure comprises, in one form, a flat rigid panel 10 supported in an upright, rearwardly inclined position by a base 12. The base comprises side walls 14 and 16 situated at an acute angle and a side wall 18 situated opposite the acute angle. The side walls 14 and 16 are connected to the side wall 18 by hinges 20 and 22—the side walls 14 and 16 being unconnected at the acute angle. The side wall 16 has an integral extension 24 connected thereto by a hinge 26 at the acute angle, which extends along the outer side of the side 14 from the acute angle toward the side 18, and is connected by a hinge 28 to the lower end of the panel 10.

In one form, the hinge 28 contains a narrow slot 30 lengthwise thereof and the side 14 contains a tongue 32 corresponding in width to the slot, which is thrust through the slot into engagement with the upper side of the extension 24, frictionally to hold the unconnected side 14 in triangular relation to the side 16. A deformable metal element or elements 34 are incorporated in the hinge 28 so as to enable bending the panel 10 to a given angular position relative to the upper side of the base and to have it remain in this position without other support. The angular position of the panel 10, with respect to the upper side of the base and the self-sustaining hinge element, enhance the frictional engagement of the parts thus holding the structure in shape. To further enhance the rigidity a deformable element or elements may be incorporated in the hinge 26 and/or the hinges 20 and 22.

Optionally, the slot and tongue formed in the hinge 28 and the side 14, respectively, may be omitted. The unconnected end of the side wall 14 is then held in position by abutting engagement with the hinge 26 at the junction of the wall 16 and the extension 24 which, as previously stated, may embody a deformable hinge element.

The hinge element which may extend across the entire width of the structure or only part way across is comprised of thin sheet metal which is stiffly resistant to deformation but can be bent repeatedly without cracking. The hinges are of the kind formed by applying flexible paper across the adjacent edges of the parts to effect their connection.

The part 10 is adapted to bear a calendar pad, picture and/or advertising media. The side 18 of the base contains one or more openings 36 and 38 for receiving writing implements and/or writing material.

As previously indicated, the structure, thus far described, may optionally be repositioned as shown in FIG. 9, so that the hollow part 12 of triangular cross-section is disposed upright with the apex providing the support, the side 18 opposite the acute angle of the apex uppermost, and the flat part 10 extending forwardly and downwardly from one side. In this position, the calendar pad is merely reversed and now the writing implements and memorandum pad, which are disposed in the part 12, are situated in a nearly vertical position.

The blank for making the mount of FIGS. 1 to 2, is shown in FIG. 3 as comprised of a single, substantially rectangular sheet of paperboard punched and scored by a single die-pressing operation, the parts being labeled so as to correspond to the reference characters employed in the description above. The deformable hinge elements are applied after the blank is cut out so as to extend across the hinge line and are fastened thereto by suitable means, for example adhesive paper or decorative paper applied to the blank.

FIG. 4 shows the base provided with an opening formed in both the end wall and the top wall for accommodation of a memorandum pad or a stack of memorandum paper to enable removing one sheet at a time.

FIG. 5 shows a modification of the structure in which the panel 10 is comprised of back and front plies 10a and 10b, folded at 40, and provided with a foot flange 42 at the lower end of the back ply which is adhesively attached to the extension 24. The foot flange is hinged to the back ply and a deformable hinge is employed to support the panel in an upright position with reference to its base. It is to be observed that the form of structure shown in FIGS. 1 and 2 may also be provided with a two-ply panel by making the panel 10 longer and folding it over.

FIGS. 6 and 7 disclose a form of the structure in which a brace 44 is formed in the rear ply 10a of the panel so as to be swingable rearwardly on a hinge to engage its distal end with the tongue 32. It is evident that this structure too may be turned over as that shown in FIG. 9, so that the part 12 sets on the apex formed by the acute angle and the part 10a, 10b is inclined forwardly and downwardly therefrom.

The blank for the structure shown in FIGS. 6 and 7, wherein a brace is employed to support the flat part relative to the hollow part, is shown in FIG. 8, and the parts are labeled with the reference characters corresponding to those employed in the description of the structure.

It should be understood that the present disclosure is for the purpose of illustration only and that this invention includes all modifications and equivalents which fall within the scope of the appended claims.

I claim:

1. A mount comprising connected angularly disposed parts, one part being of hollow triangular cross-section having sides situated at an acute angle and a side opposite the acute angle, and the other part being flat, hinge means connecting an edge of each of the sides forming the acute angle to an edge of the side opposite the acute angle, a hinge element pivotally connected to the opposite end of one of the sides making the acute angle and to the other part, said hinge element forming the connection between the parts and having a portion engaged with the other of the sides making the acute angle, and deformable means embodied in said hinge element operative to hold the parts in angular relation to each other at its junction with said parts, 2. A mount comprising connected angularly disposed parts, one part being of hollow triangular cross-section having sides situated at an acute angle and a side opposite the acute angle, and the other part being a flat panel, hinge means connecting an edge of each of the sides forming the acute angle to an edge of the side opposite the acute angle, said flat panel extending angularly from the face of one of the sides which makes the acute angle, a connecting panel hinged at its ends, respectively, to the flat panel and the other side with a portion intermediate its hinges coinciding with the one side, said hinge connecting the flat panel to the connecting panel containing a slot, a tongue extending from the one side through the slot into engagement with the connecting panel, and deformable means embodied in the hinge, connecting the flat panel to the connecting panel, operating to hold the parts in angular relation to each other.

3. A mount according to claim 2, wherein the side opposite the acute angle contains one or more openings providing access to the interior of the one part.

4. A mount according to claim 2, wherein the flat part is comprised of two plies.

5. A mount according to claim 1, wherein the flat part has front and back plies and the back ply contains a brace operative to hold the flat part at an angle to the one part.

6. A mount according to claim 2, wherein the hinge connecting the sides at the acute angle embodies a deformable element operative to hold the sides making the acute angle at said angle.

References Cited by the Examiner

UNITED STATES PATENTS

| 748,117 | 12/1903 | Stowe | 40—120 X |
| 1,411,022 | 3/1922 | Heidenreich | 40—124.1 |
| 2,142,826 | 1/1939 | Rosello | 40—124.1 X |
| 2,472,166 | 6/1949 | Mathewson | 40—124.1 |
| 2,690,624 | 10/1954 | Phillips | 40—11 |
| 3,002,720 | 10/1961 | Cross | 248—35 |

FOREIGN PATENTS 162,551  5/1921  Great Britain.

EUGENE R. CAPOZIO, *Primary Examiner.*

JEROME SCHNALL, *Examiner.*

WENCELSO J. CONTRERAS, *Assistant Examiner.*